US011956302B1

(12) United States Patent
Mohajeri et al.

(10) Patent No.: US 11,956,302 B1
(45) Date of Patent: Apr. 9, 2024

(54) INTERNET PROTOCOL VERSION 4-TO-VERSION 6 REDIRECT FOR APPLICATION FUNCTION-SPECIFIC USER ENDPOINT IDENTIFIERS

(71) Applicant: AT&T Intellectual Property I, L.P., Atlanta, GA (US)

(72) Inventors: Shahram Mohajeri, Kirkland, WA (US); Thomas Cannon, Fallbrook, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/059,418

(22) Filed: Nov. 28, 2022

(51) Int. Cl.
*H04L 67/02* (2022.01)
*H04L 61/5007* (2022.01)
*H04L 101/686* (2022.01)

(52) U.S. Cl.
CPC .......... *H04L 67/02* (2013.01); *H04L 61/5007* (2022.05); *H04L 2101/686* (2022.05)

(58) Field of Classification Search
CPC .. H04L 67/02; H04L 61/5007; H04W 84/042; H04W 36/32; H04W 36/08
See application file for complete search history.

(56) References Cited

U.S. PATENT DOCUMENTS

| | | | |
|---|---|---|---|
| 11,283,883 B1 * | 3/2022 | Krishan | H04M 15/8228 |
| 2021/0099968 A1 * | 4/2021 | Tiwari | H04W 60/06 |
| 2021/0321251 A1 * | 10/2021 | Colom | H04L 12/1407 |
| 2022/0094664 A1 * | 3/2022 | Mudric | H04L 65/65 |
| 2022/0322067 A1 * | 10/2022 | Kim | H04W 12/0433 |
| 2022/0322270 A1 * | 10/2022 | Srivastava | H04L 67/55 |

(Continued)

FOREIGN PATENT DOCUMENTS

| | | | | |
|---|---|---|---|---|
| EP | 2465277 A2 * | 6/2012 | | H04L 61/6059 |
| WO | WO-2020063971 A1 * | 4/2020 | | H04L 12/1407 |

OTHER PUBLICATIONS

3rd ETSI TS 123 548 V17.2.0, May 2022,5G; 5G System Enhancements for Edge Computing; Stage 2 (3GPP TS 23.548 version 17.2.0 Release 17) (Year: 2022).*

(Continued)

*Primary Examiner* — Chirag R Patel

(57) ABSTRACT

The present disclosure describes a device, computer-readable medium, and method for an IPv4-to-IPv6 redirect to enable use of application function-specific user endpoint identifiers (AF-specific UEIds). In one example, a method performed by a processing system includes receiving, from an application function of a communications network, a redirected request for an AF-specific UEId that is unique to a user endpoint device and the application function, where the redirected request includes an IPv6 address associated with the user endpoint device, querying a binding support function of the communications network for a subscription permanent identifier associated with the IPv6 address associated with the user endpoint device, querying an application function-specific management function for an AF-specific UEId associated with the subscription permanent identifier and an identifier of the application function, and forwarding the AF-specific UEId associated with the subscription permanent identifier and the identifier of the application function to the application function.

20 Claims, 4 Drawing Sheets

(56) References Cited

U.S. PATENT DOCUMENTS

2023/0011348 A1* 1/2023 Kulshrestha ............ H04L 47/24
2023/0143200 A1* 5/2023 Kweon ............... H04L 41/5051
709/223

OTHER PUBLICATIONS

Shahram Mohajeri, "Dynamically Generating Application Function-Specific User Endpoint Identifiers," U.S. Appl. No. 18/059,416, filed Nov. 28, 2022, 30 pages.

* cited by examiner

INTERNET PROTOCOL VERSION 4-TO-VERSION 6 REDIRECT FOR APPLICATION FUNCTION-SPECIFIC USER ENDPOINT IDENTIFIERS

The present disclosure relates generally to digital privacy, and relates more particularly to devices, non-transitory computer-readable media, and methods for an Internet Protocol version 4-to-version 6 redirect to enable use of application function-specific user endpoint identifiers.

BACKGROUND

In the Third Generation Partnership Project (3GPP), each subscriber identity module (SIM) card may be allocated a unique identifier or UEId. For instance, in generations up to fourth generation (4G) mobile networks, the UEId may comprise an international mobile subscriber identity (IMSI); in fifth generation (5G) mobile networks, the UEId may comprise a subscription permanent identifier (SUPI) or a generic public subscription identifier (GPSI). An application function-specific UEId is a UEId that is generated for a device specifically for use with a particular application function. The use of different AF-specific UEIds for different application functions prevents correlation and tracking of UEIds (and, thus, users) across applications and helps to maintain user privacy.

SUMMARY

In one example, the present disclosure describes a device, computer-readable medium, and method for an Internet Protocol version 4-to-version 6 redirect to enable use of application function-specific user endpoint identifiers. For instance, in one example, a method performed by a processing system including at least one processor includes receiving, from an application function of a communications network, a redirected request for an application function-specific user endpoint identifier that is unique to a user endpoint device and the application function, where the redirected request includes an internet protocol version 6 address associated with the user endpoint device, querying a binding support function of the communications network for a subscription permanent identifier associated with the internet protocol version 6 address associated with the user endpoint device, querying an application function-specific management function for an application function-specific user endpoint identifier associated with the subscription permanent identifier and an identifier of the application function, and forwarding (e.g., in a redirect through the user endpoint device) the application function-specific user endpoint identifier associated with the subscription permanent identifier and the identifier of the application function to the application function.

In another example, a non-transitory computer-readable medium stores instructions which, when executed by a processing system including at least one processor, cause the processing system to perform operations. The operations include receiving, from an application function of a communications network, a redirected request for an application function-specific user endpoint identifier that is unique to a user endpoint device and the application function, where the redirected request includes an internet protocol version 6 address associated with the user endpoint device, querying a binding support function of the communications network for a subscription permanent identifier associated with the internet protocol version 6 address associated with the user endpoint device, querying an application function-specific management function for an application function-specific user endpoint identifier associated with the subscription permanent identifier and an identifier of the application function, and forwarding (e.g., in a redirect through the user endpoint device) the application function-specific user endpoint identifier associated with the subscription permanent identifier and the identifier of the application function to the application function.

In another example, a system includes a processing system including at least one processor and a non-transitory computer-readable medium storing instructions which, when executed by the processing system, cause the processing system to perform operations. The operations include receiving, from an application function of a communications network, a redirected request for an application function-specific user endpoint identifier that is unique to a user endpoint device and the application function, where the redirected request includes an internet protocol version 6 address associated with the user endpoint device, querying a binding support function of the communications network for a subscription permanent identifier associated with the internet protocol version 6 address associated with the user endpoint device, querying an application function-specific management function for an application function-specific user endpoint identifier associated with the subscription permanent identifier and an identifier of the application function, and forwarding (e.g., in a redirect through the user endpoint device) the application function-specific user endpoint identifier associated with the subscription permanent identifier and the identifier of the application function to the application function.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
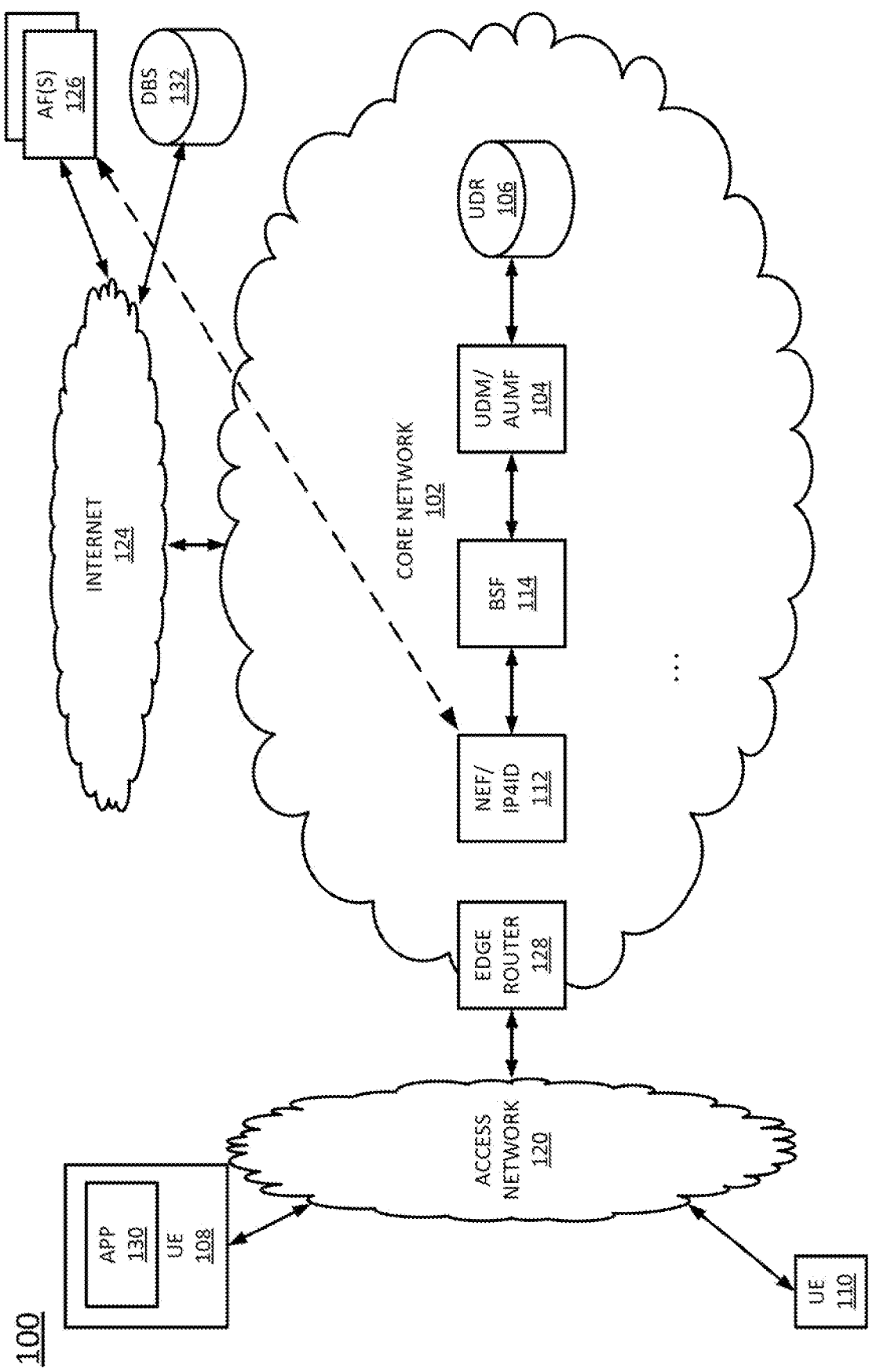
FIG. 1 illustrates an example system in which examples of the present disclosure for an Internet Protocol version 4-to-version 6 redirect to enable use of application function-specific user endpoint identifiers may operate.

In one example, the present disclosure provides a system, method, and non-transitory computer readable medium for an Internet Protocol version 4-to-version 6 redirect to enable use of application function-specific user endpoint identifiers. As discussed above, in the Third Generation Partnership Project (3GPP), each subscriber identity module (SIM) card may be allocated a unique identifier or UEId. For instance, in generations up to fourth generation (4G) mobile networks, the UEId may comprise an international mobile subscriber identity (IMSI); in fifth generation (5G) mobile networks, the UEId may comprise a subscription permanent identifier (SUPI) or a generic public subscription identifier (GPSI). An application function (AF)-specific UEId is a UEId that is generated for a device specifically for use with a particular application function. The use of different AF-specific UEIds for different application functions prevents correlation and tracking of UEIds (and, thus, users) across applications and helps to maintain user privacy.

Many AFs (e.g., application servers) currently still use Internet Protocol version 4 (IPv4), even with the ongoing deployment of Internet Protocol version 6 (IPv6). As such, mobile network operators (MNOs) need to serve IPv4 application functions over application programming interfaces (APIs). These MNOs may use network address translation (NAT) and/or port address translation (PAT) solutions to translate a user endpoint device's private IP address into a public IP address before the user endpoint device packets leave the MNO's network over a N6 interface. However, 3GPP architecture does not currently offer a solution to enable a third party AF to exchange a network address translated or a port address translated IPv4 address for a unique and anonymous UEId (e.g., an AF-specific UEId, which may be a generic public subscription identifier (GPSI) in the form of an external identifier). In the absence of an AF-specific UEId, the AF may have no good means of uniquely and anonymously identifying the target user endpoint device over the AF's API invocations towards a 5G network exposure function (NEF).

Currently, the NEF-exposed Nnef_UEId_GET service API requires an AF to provide the IP address of the user endpoint device, which is used to match the user endpoint device to its network subscription permanent identifier (SUPI). In networks where public IPv4 addresses are not assigned to user endpoint devices on a 1:1 basis, it is common for a proxy/traffic detection function (TDF)/user plane function (UPF) platform to translate a private IP address of the user endpoint device into a public IP address using either NAT or PAT. PAT address assignment will typically associate many user endpoint devices to a single public IP address (i.e., a many:1 relationship). Individual transport control protocol (TCP) sessions in this case are distinguished from each other using specific port numbers. NAT, on the other hand, translates the private IP address of the user endpoint device into a dedicated public IP address (i.e., a 1:1 relationship).

With many mobile operators, NAT and PAT are "mechanical" processes that occur without stateful registration of the translation details (e.g., the private to public IP address mapping is not stored). This prevents the NEF from using the IPv4 address provided with the Nnef_UEId_GET invocation for identification of the user endpoint device. For instance, the proxy/TDF/UPF platform may send a request from the user endpoint device to the AF (application server), where the request includes the translated IPv4 address. In response, the AF may send a request to the NEF for the UEId of the user endpoint device associated with the public IPv4 address. When the NEF queries a binding support function (BSF) for the SUPI associated with the public IPv4 address, however, the query will fail due to the lack of the private to public IPv4 mapping.

An alternative approach is to use the edge enabler client (EEC) on the user endpoint device to provide the private IPv4 address of the user endpoint device to an edge enabler server (EES). The EES would then invoke the Nnef_U-EId_GET service API using the private IPv4 address in place of the public IPv4 address. However, MNOs that run at large scale may have their networks divided into regional service and support zones supported by different BSFs. Private IPv4 address ranges are commonly reused across multiple service and support zones in such cases. Thus, private IPv4 addresses shared by the EEC will not necessarily be unique. It is highly likely that a user endpoint device in one service or support zone will have the same private IPv4 address as a user endpoint device in another service or support zone. Thus, when the EES invokes the Nnef_UEId_GET service API, the NEF may not be able to determine the user endpoint device's identity (i.e., UEId), since different instances of the BSF may associate the private IPv4 address of the user endpoint device with different SUPIs.

Examples of the present disclosure redirect dual stack user endpoint devices (i.e., user endpoint devices including stacks that support both IPv4 and IPv6) to a new network function, referred to herein as an IP4ID or stack redirect function, which forces the user endpoint devices to switch to the IPv6 stack. More specifically, an IPv4 application function may direct an application client on a user endpoint device to perform a GET_UEId service operation to identify the user endpoint device. Upon receiving a GET_UEId request from the user endpoint device, the application function may redirect (e.g., hypertext transfer protocol (HTTP) 302) the user endpoint device to the IP4ID network function, which is associated with a known uniform resource identifier (URI) served by 5GC (the URI of the IP4ID network function may be provided to the application function upon onboarding onto a common API framework/NEF). The IP4ID URI endpoint may be registered in the domain name system (DNS) as an IPv6 address by the MNO. Thus, the user endpoint device's lookup for the IP4ID URI will force the user endpoint device to switch from the IPv4 stack to the IPv6 stack and to subsequently send the GET_UEId request to the IP4ID network function. Since the IP4ID network function receives a unique (i.e., 1:1) IPv6 address from the user endpoint device, the IP4ID network function can easily use an application function-specific UEId management function (AUMF) service API to assign and extract the UE Id. These and other aspects of the present disclosure are discussed in further detail with reference to FIGS. 1-4, below.

To further aid in understanding the present disclosure, FIG. 1 illustrates an example system 100 in which examples of the present disclosure for an Internet Protocol version 4-to-version 6 redirect to enable use of application function-specific user endpoint identifiers may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks such as access network 120 and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include a plurality of network elements, including at least a network exposure function (NEF)/IP4ID (stack redirect) function 112, a binding support function (BSF) 114, a unified data management (UDM) element/application function-specific UEId management function (AUMF) 104, and a unified data repository (UDR) 106. Although the NEF/IP4ID 112, BSF 114, UDM/AUMF 104, and UDR 106 are illustrated as separate elements in FIG. 1, in one example one or more of the NEF/IP4ID 112, BSF 114, UDM/AUMF 104, and UDR 106 may be integrated in a single element (e.g., a single application server or the like). For instance, a single application server may perform the functions of the NEF/IP4ID 112, BSF 114, and UDM/AUMF 104 and may communicate with the UDR 106. Additionally, the core network 102 may include a plurality of edge routers, including edge router 128. For ease of illustration, various additional elements of the core network 102 are omitted from FIG. 1.

In one example, the access network 120 may comprise a Digital Subscriber Line (DSL) network, a public switched telephone network (PSTN) access network, a broadband cable access network, a Local Area Network (LAN), a wireless access (e.g., an IEEE 802.11/Wi-Fi network and the like), a cellular access network, a 3rd party network, and the like. For example, the operator of the core network 102 may provide a cable television service, an IPTV service, a streaming service, or any other types of telecommunication services to subscribers via access network 120. In one example, the core network 102 may be operated by a telecommunication network service provider (e.g., an Internet service provider, or a service provider who provides Internet services in addition to other telecommunication services). The core network 102 and the access network 120 may be operated by different service providers, the same service provider or a combination thereof, or the access network 120 may be operated by an entity having core businesses that are not related to telecommunications services, e.g., corporate, governmental, or educational institution LANs, and the like.

In one example, the access network 120 may be in communication with one or more user endpoint devices 108 and 110. The access network 120 may transmit and receive communications between the user endpoint devices 108 and 110, between the user endpoint devices 108 and 110, the application function(s) (AF(s)) (e.g., application server(s)) 126, the NEF/IP4ID 112, other components of the core network 102, devices reachable via the Internet in general, and so forth. In one example, each of the user endpoint devices 108 and 110 may comprise any single device or combination of devices that may comprise a user endpoint device, such as computing system 400 depicted in FIG. 4, and may be configured as described below. For example, the user endpoint devices 108 and 110 may each comprise a mobile device, a cellular smart phone, a gaming console, a set top box, a laptop computer, a tablet computer, a desktop computer, an application server, a wearable device (e.g., a smart watch or fitness tracker), an augmented reality (AR)/virtual reality (VR) headset, customer premises equipment (e.g., gateway devices), a bank or cluster of such devices, and the like.

In one example, any one of the user endpoint devices 108 and 110 may run an application, such as APP 130. The APP 130 may communicate with the AF(s) 126 or other application functions or servers in the system 100 in order to provide a service to the user endpoint devices 108 and 110, as discussed in greater detail below.

In one example, one or more AFs 126 and one or more databases 132 may be accessible to user endpoint devices 108 and 110 via Internet 124 in general. The AF(s) 126 and DBs 132 may be associated with Internet software applications that may exchange data with the user endpoint devices 108 and 110 over the Internet 124. Thus, some of the AFs 126 and DBs 132 may host applications including video conferencing applications, extended reality (e.g., virtual reality, augmented reality, mixed reality, and the like) applications, streaming media applications, social networking applications, immersive gaming applications, and the like.

Figure 4:
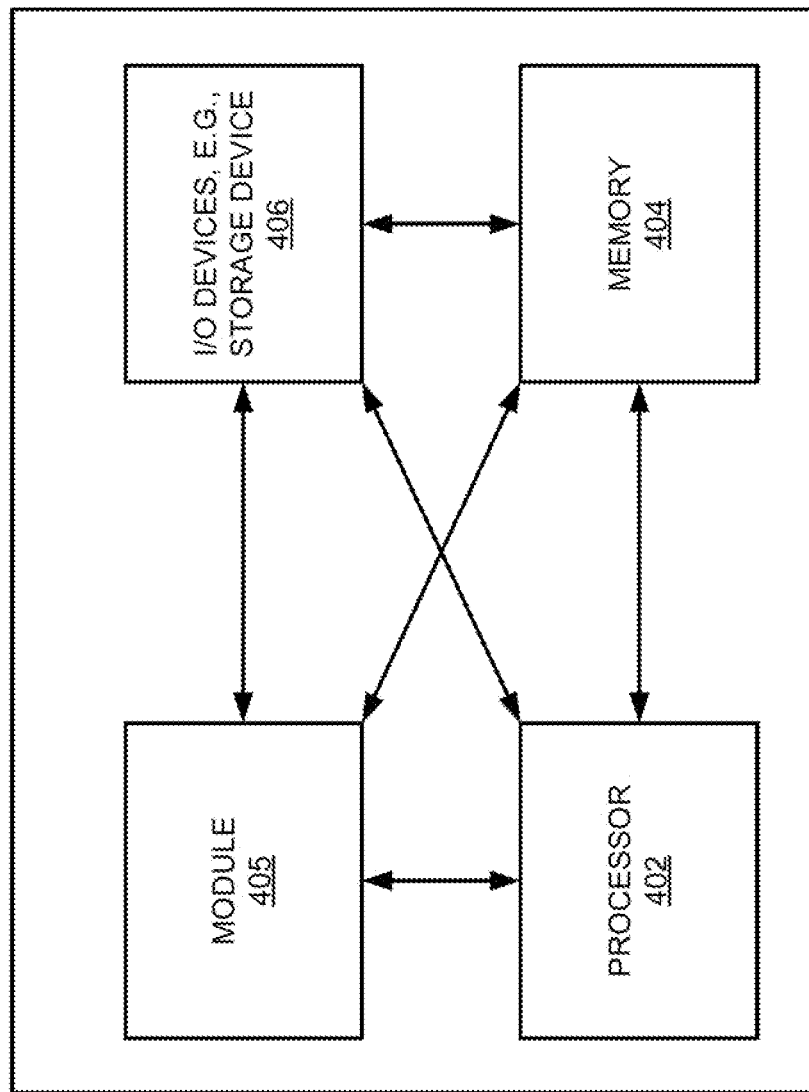
FIG. 4 depicts a high-level block diagram of a computing device specifically programmed to perform the functions described herein.

In accordance with the present disclosure, the NEF/IP4ID 112, BSF 114, UDM/AUMF 104, and UDR 106 may be collectively configured to provide one or more operations or functions in connection with examples of the present disclosure for an Internet Protocol version 4-to-version 6 redirect to enable use of application function-specific user endpoint identifiers, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, the NEF/IP4ID 112, BSF 114, and UDM/AUMF 104 may cooperate, as discussed in further detail below, to force the stack of the UE 108 on which application 130 resides to switch from IPv4 to IPv6 in order to acquire an application function-specific UEId for the user endpoint device 108 and application function. Thus one or more of the NEF/IP4ID 112, BSF 114, and UDM/AUMF 104 may comprise an individual application server. Alternatively, as discussed above, a single application server may perform the functions of two or more of the NEF/IP4ID 112, BSF 114, and UDM/AUMF 104.

The UDR 106 may store a plurality of application function-specific UEIds for user endpoint devices and application functions that have already been generated. In one example, the UDR 106 may comprise a physical storage device integrated with the NEF/IP4ID 112, BSF 114, and UDM/AUMF 104 (e.g., a database server or a file server), or attached or coupled to the UDM/AUMF 104, in accordance with the present disclosure.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access network 120, and/or Internet 124 may comprise a content distribution network (CDN) having ingest servers, edge servers, and the like. Similarly, although only one access network 120 is shown, in other examples, access network 120 may comprise a plurality of different access networks that may interface with the core network 102 independently or in a chained manner. For example, UE devices 108 and 110 may communicate with the core network 102 via different access networks. Thus, these and other modifications are all contemplated within the scope of the present disclosure.

Figure 2:
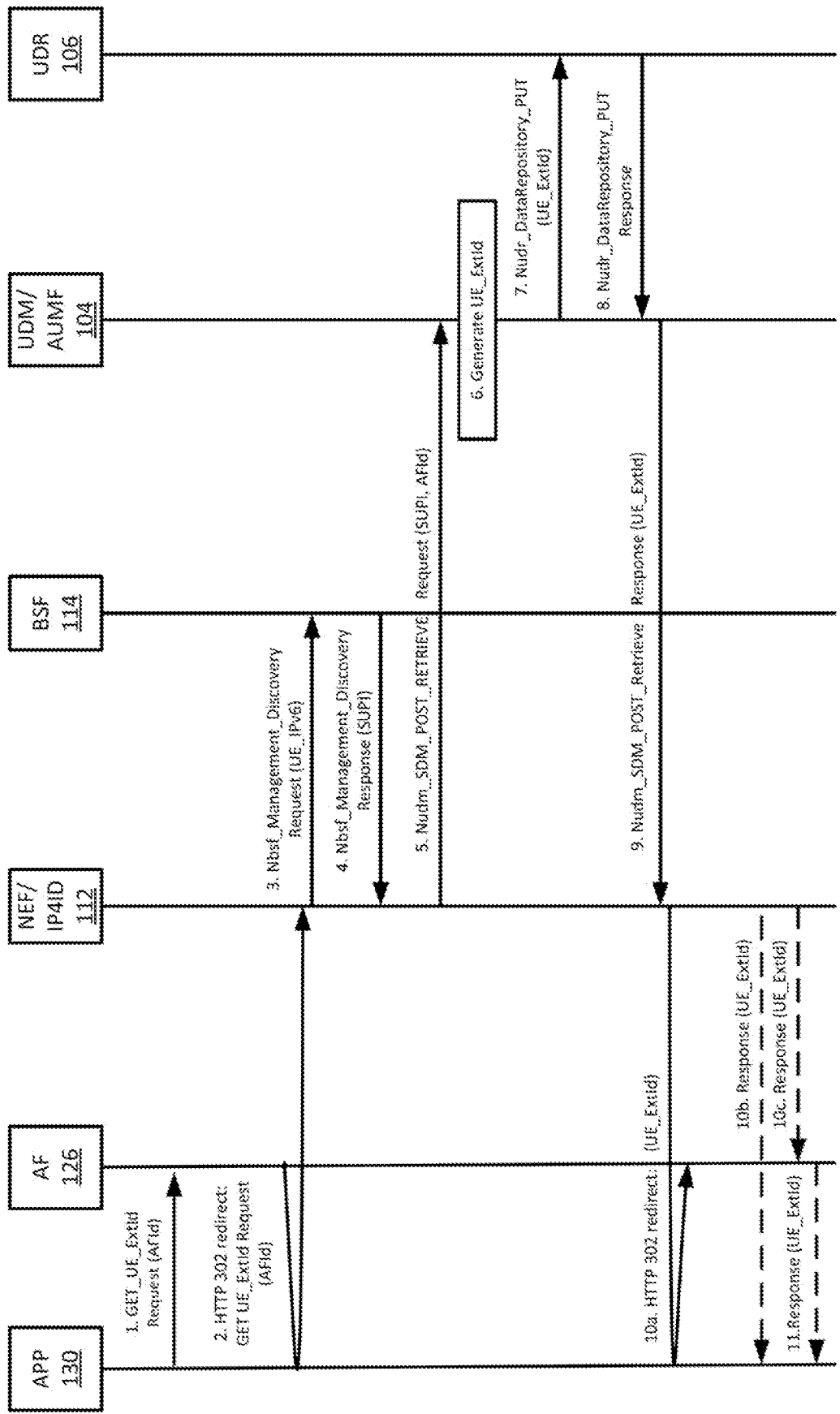
FIG. 2 illustrates a call flow diagram that shows a more detailed view of the operations of the network exposure/stack redirect function, a binding support function, a unified data management element/application function-specific user endpoint identifier management function, and a unified data repository of FIG. 1.

To further aid in understanding the present disclosure, FIG. 2 illustrates call flow diagram 200 that shows a more detailed view of the operations of the network exposure function (NEF)/stack redirect (IP4ID) function 112, the binding support function (BSF) 114, the unified data management (UDM) element/application function-specific UEId management function (AUMF) 104, and the unified data repository (UDR) 106 of FIG. 1. In particular, FIG. 2 illustrates the process by which an application function-specific UEId for a user endpoint device and application function 130 may be retrieved using an HTTP 302 redirect operation.

As illustrated in FIG. 2, the application 130 running on the user endpoint device 108 may first invoke an external identifier retrieval (GET_UE_ExtId) service operation (or any other interaction between the application client and a remote application server which requires the application server to know the user's anonymous identity, for example for authenticating use of a subscription service by the user), by sending an external identifier request message (GET_UE_ExtId Request) to an application function (e.g., application server) 126. As discussed above, the user endpoint device 108 may include a dual IPv4/1Pv6 stack, and may use either the IPv4 (broadly a first version of an Internet Protocol) stack or the IPv6 (broadly a second version of an Internet Protocol) stack based on the endpoint (e.g., application function or application server) with which the user endpoint device 108 is communicating. The external identifier request message requests an application function-specific UEId associated with the application function 126 and the user endpoint device 108 on which the application 130 resides. The application function-specific UEId may be used by the application function 126 or the application client 130 for API calls. As such, the external identifier request message may include at least the identifier of the application function 126 (AF_Id).

The application function 126 may redirect the external identifier request message to the known URI of a stack redirect function, which is implemented in the NEF/IP4ID 112. As part of the redirect, the user endpoint device 108 is forced to acquire an IPv6 address from the 5G session management function (SMF) and then perform an HTTP "GET" operation in conjunction with the NEF/IP4ID 112 URI endpoint.

As such, the NEF/IP4ID 112 receives the identifier of the application function 126 (AF_Id). The NEF/IP4ID 112 may then send a management discovery request message (Nbsf_Management_Discovery Request) to the BSF 114. The management discovery request may request the subscription permanent identifier (SUPI) for the user endpoint device 108 on which the application 130 resides. As such, the management discovery request may include the IPv6 address of the user endpoint device 108 on which the application 130 resides (UE_IPv6).

The BSF 114 may respond to the management discovery request message with a management discovery response message (Nbsf_Management_Discovery Response) that provides the SUPI that corresponds to the IPv6 address of the user endpoint device 108 on which the application 130 resides (SUPI). The management discovery response message may be sent back to the NEF/IP4ID 112.

Once the NEF/IP4ID 112 has acquired the SUPI for the user endpoint device 108 on which the application 130 resides, the NEF/IP4ID 112 may send a Nudm_SDM_POST_Retrieve request message to the UDM/AUMF 104. The Nudm_SDM_POST_Retrieve request message may include the SUPI for the user endpoint device 108 on which the application 130 resides and the identifier of the application function 126 (AF_Id). The Nudm_SDM_POST_Retrieve request message may request the application function-specific UEId (e.g., external identifier, or UE_ExtId) for the application function 126 and the user endpoint device 108 on which the application 130 resides.

The UDM/AUMF 104 may next dynamically generate a unique application function-specific UEId for the application function 126 and the user endpoint device 108 on which the application 130 resides (UE_Ext_Id). The UDM/AUMF 104 may then store the dynamically generated application function-specific UEId for the application function 126 and the user endpoint device 108 on which the application 130 resides (UE_Ext_Id) in the UDR 106 (e.g., via a Nudr_DataRepository_PUT service operation).

Once the UDR 106 acknowledges storage of the dynamically generated application function-specific UEId for the application function 126 and the user endpoint device 108 on which the application 130 resides (UE_Ext_Id) (e.g., via a Nudr_DataRepository_PUT response message), the UDM/AUMF 104 may send the dynamically generated application function-specific UEId for the application function 126 and the user endpoint device 108 on which the application 130 resides (UE_Ext_Id) to the NEF/IP4ID 112 (e.g., via a Nudm_SDM_POST_Retrieve response message). The NEF/IP4ID 112 may then forward the dynamically generated application function-specific UEId for the application function 126 and the user endpoint device 108 on which the application 130 resides (UE_Ext_Id) to the application function 126 in the query parameter of an HTTP 302 redirect (e.g., via an HTTP 302 redirect message).

The application function 126 may then proceed accordingly using the application function-specific UEId (UE_Ext_Id).

Optionally, the NEF/IP4ID 112 may respond directly to the user endpoint device 108 on which the application 130 resides, as opposed to initiating an HTTP 302 redirect to the application function 126.

Also optionally, the IP4ID 112 may directly inform the AF 126 of the dynamically generated application function-specific UEId, via notification (as opposed to informing the AF 126 indirectly through the HTTP redirect through the user endpoint device 108). In this case, the request from the AF 126 which was redirected via the user endpoint device 108 would carry a reference-Id. The NEF/IP4ID 112 would echo the reference-Id in the direct notification to the AF 126, so that the AF 126 is able to associate the notification from the NEF/IP4ID 112 with the request that the AF 126 sent earlier through the user endpoint device 108.

Also optionally, the application function 126 may provide the application 130 residing on the user endpoint device 108 with the AF-specific UEId (UE_Ext_Id), so that the AF-specific UEId can be used moving forward to identify the user endpoint device 108 and/or user.

The call flow illustrated in FIG. 2 assumes that there is no external user identifier for the application function 126 and the user endpoint device 108 on which the application 130 resides in the UDR 106. However, if the UDR already contains the external user identifier for the application function 126 and the user endpoint device 108 on which the application 130 resides, then the UDM/AUMF 104 may simply perform a GET operation in the UDR 106 to extract the existing AF-specific UEId.

Figure 3:
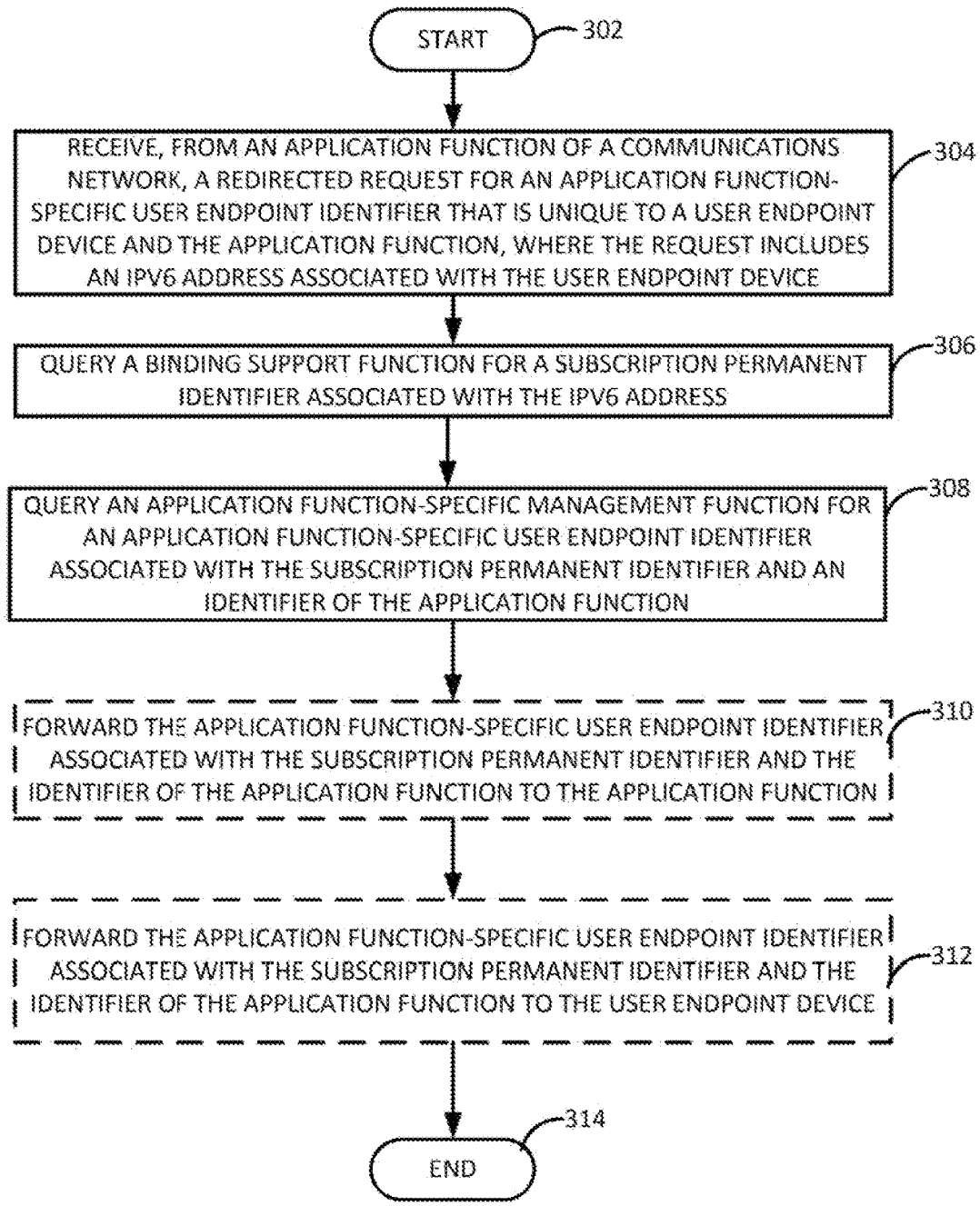
FIG. 3 illustrates a flowchart of an example method for an Internet Protocol version 4-to-version 6 redirect to enable use of application function-specific user endpoint identifiers.

FIG. 3 illustrates a flowchart of an example method 300 for an Internet Protocol version 4-to-version 6 redirect to enable use of application function-specific user endpoint identifiers. In one example, the method 300 may be performed by the NEF/IP4ID 112 illustrated in FIGS. 1 and 2. However, in other examples, the method 300 may be performed by another device, such as the computing system 400 of FIG. 4, discussed in further detail below. For the sake of discussion, the method 300 is described below as being performed by a processing system (where the processing system may comprise a component of the NEF/IP4ID 112, the computing system 400, or another device).

The method 300 begins in step 302. In step 304, the processing system may receive, from an application function of a communications network, a redirected request for an application function-specific user endpoint identifier that is unique to a user endpoint device and the application function, where the request includes an IPv6 address associated with the user endpoint device.

In one example, the user endpoint device may comprise a mobile device (e.g., a mobile phone, a tablet computer, a wearable device, a pair of smart glasses or goggles or the like). The user endpoint device may be a dual stack device that supports both IPv4 (broadly a first version of Internet Protocol) and IPv6 (broadly a second version of Internet Protocol). The application function may comprise a software application that is supported by an application server (and that is cooperating with an application residing on the user endpoint device). The application function may use IPv4.

As discussed above, the application function-specific UEId may be an identifier (e.g., an external identifier) that is unique to the combination of the user endpoint device and the application function. That is, each application function with which the user endpoint device interacts may be associated with a different application function-specific UEId. Moreover, other instances of the application functions interacting with other user endpoint devices may be associated with different application function-specific UEIds.

In one example, the request may be originally directed from the user endpoint device to the application function. However, the request may include an IPv4 address of the user endpoint device, which may not be possible to map to an application function-specific UEId, as discussed above. Thus, when the application function receives the request, the application function may redirect the request (e.g., using an HTTP 302 redirect). The redirect may include the URI of a network exposure function (NEF)/IP4ID (stack redirect) function of which the processing system is a part. The IP4ID URI endpoint may be registered in the DNS as an IPv6 address by the MNO. Thus, the user endpoint device's lookup for the IP4ID URI will force the user endpoint device to acquire an IPv6 address from a session management function (and, thus, to switch from the IPv4 stack to the IPv6 stack) and to subsequently send the GET_UEId request to the IP4ID network function. Thus, the redirected request received in step 302 may comprise an HTTP GET request.

In one example, the redirected request from the application function may specify at least an identifier associated with the application function (AF_Id).

In step 306, the processing system may query a binding support function of the communications network for a subscription permanent identifier (SUPI) associated with the IPv6 address associated with the user endpoint device.

In one example, the processing system may specify the IPv6 address associated with the user endpoint. The IPv6 address may be indexed to the SUPI by the binding support function. Thus, the query to the binding support function may provide the IPv6 address associated with the user endpoint device and may return the corresponding SUPI.

In step 308, the processing system may query an application function-specific management function for an application function-specific user endpoint identifier associated with the subscription permanent identifier (SUPI) and an identifier of the application function (AFId).

In one example, the application function-specific management function (AUMF) may be integrated into a unified data management (UDM) function of the communications network. The query to the AUMF may provide the SUPI associated with the user endpoint device (as obtained from the binding support function in step 306) and the AFId (as obtained in the redirected request in step 304). The query to the AUMF may return the application function-specific user endpoint identifier (UEId) associated with the SUPI and the AFId. In one example, the application function-specific UEId comprises an external identifier for the UE.

In one example (e.g., where the application function-specific UEId has already been provisioned for the user endpoint device and the application function), the AUMF/UDM may retrieve the application function-specific UEId on the processing system's behalf, e.g., from a unified data repository (UDR) that stores provisioned application function-specific UEIds. However, in another example (e.g., where the application function-specific UEId has not already been provisioned for the user endpoint device and the application function), the AUMF/UDM may dynamically generate the application function-specific UEId. When the AUMF/UDM dynamically generates the application function-specific UEId, the AUMF/UDM may store the dynamically generated application function-specific UEId in the UDR for future use and retrieval (unless the application function-specific UEId is selectively deleted by a user of the user endpoint device). Thus, the next time the application function-specific UEId is required by the application function, the application specific UEId can be retrieved from the unified data repository.

In optional step 310 (illustrated in phantom), the processing system may forward the application function-specific user endpoint identifier associated with the subscription permanent identifier (SUPI) and the identifier of the application function (AFId) to the application function.

In one example, the application-specific UEId may be forwarded to the application function via an HTTP 302 redirect, where the application-specific UEId is contained in the query parameter of the redirect. The application function may, in turn, forward the application-specific UEId to the user endpoint device.

Alternatively or in addition, in optional step 312 (illustrated in phantom), the processing system may forward the application function-specific user endpoint identifier associated with the subscription permanent identifier (SUPI) and the identifier of the application function (AFId) to the user endpoint device.

Having forwarded the application function-specific UEId to the application function (e.g., as in step 310) and/or to the user endpoint device (e.g., as in step 312), the method 300 may end in step 314.

Although not expressly specified above, one or more steps of the method 300 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

Thus, examples of the present disclosure redirect dual stack user endpoint devices to a new network function which forces the user endpoint devices to switch to the IPv6 stack. More specifically, an IPv4 application function may direct an application client on a user endpoint device to perform a GET_UEId service operation to identify the user endpoint device. Upon receiving a GET_UEId request from the user endpoint device, the application function may redirect (e.g., HTTP 302) the user endpoint device to the IP4ID network function, which is associated with a known URI served by 5GC (the URI of the IP4ID network function may be provided to the application function upon onboarding onto a common API framework/NEF). The IP4ID URI endpoint may be registered in the domain name system (DNS) as an IPv6 address by the MNO. Thus, the user endpoint device's lookup for the IP4ID URI will force the user endpoint device to switch from the IPv4 stack to the IPv6 stack and to subsequently send the GET_UEId request to the IP4ID network function. Since the IP4ID network function receives a unique (i.e., 1:1) IPv6 address from the user endpoint device, the IP4ID network function can easily use an application function-specific UEId management function (AUMF) service API to assign and extract the UEId.

FIG. 4 depicts a high-level block diagram of a computing device specifically programmed to perform the functions described herein. For example, any one or more components or devices illustrated in FIG. 1 or described in connection with the method 300 may be implemented as the system 400. For instance, the NEF/IP4ID 112 of FIG. 1 (such as might be used to perform the method 300) could be implemented as illustrated in FIG. 4. In another example, the UDM/AUMF 104, the BSF 114, application function 126 and/or one of the user endpoint devices 108 or 110 of FIG. 1 could be implemented as illustrated in FIG. 4.

As depicted in FIG. 4, the system 400 comprises a hardware processor element 402, a memory 404, a module 405 for performing an Internet Protocol version 4-to-version 6 redirect to enable use of application function-specific user endpoint identifiers, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for performing an Internet Protocol version 4-to-version 6 redirect to enable use of application function-specific user endpoint identifiers may include circuitry and/or logic for performing special purpose functions relating to estimating available bandwidth ranges and/or modifying settings for data transfers according to available bandwidth ranges. The input/output devices 406 may include, for example, storage devices (including but not limited to, a tape drive, a floppy drive, a hard disk drive or a compact disk drive), a receiver, a transmitter, a fiber optic communications line, an output port, or a user input device (such as a keyboard, a keypad, a mouse, and the like).

Although only one processor element is shown, it should be noted that the specific-purpose computer may employ a plurality of processor elements. Furthermore, although only one specific-purpose computer is shown in the Figure, if the method(s) as discussed above is implemented in a distributed or parallel manner for a particular illustrative example, i.e., the steps of the above method(s) or the entire method(s) are implemented across multiple or parallel specific-purpose computers, then the specific-purpose computer of this Figure is intended to represent each of those multiple specific-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a specific purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for performing an Internet Protocol version 4-to-version 6 redirect to enable use of application function-specific user endpoint identifiers (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for performing an Internet Protocol version 4-to-version 6 redirect to enable use of application function-specific user endpoint identifiers (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
   receiving, from an application function of a communications network by a processing system including at least one processor, a redirected request for an application function-specific user endpoint identifier that is unique to a combination of a user endpoint device and the application function, where a version of the redirected request that was sent from the user endpoint device to the application function included an internet protocol version 4 address associated with the user endpoint device that the application function could not map to the application function-specific user endpoint identifier and the redirected request includes an identifier of the application function and an internet protocol version 6 address associated with the user endpoint device;
   querying, by the processing system, a binding support function of the communications network for a subscription permanent identifier associated with the internet protocol version 6 address associated with the user endpoint device;
   querying, by the processing system, an application function-specific management function for an application function-specific user endpoint identifier associated with the subscription permanent identifier and the identifier of the application function; and
   forwarding, by the processing system, the application function-specific user endpoint identifier associated with the subscription permanent identifier and the identifier of the application function to the application function.

2. The method of claim 1, wherein the application function comprises a software application that is supported by an application server.

3. The method of claim 1, wherein the user endpoint device comprises a dual stack device that supports internet protocol version 4 and internet protocol version 6.

4. The method of claim 3, wherein the application function uses the internet protocol version 4.

5. The method of claim 1, wherein the user endpoint device sends the redirected request to the processing system in response to a hypertext transfer protocol redirect received from the application function.

6. The method of claim 5, wherein the processing system is part of a stack redirect function of the communications network, and wherein the stack redirect function is registered in a domain name system of the communications network as an internet protocol version 6 address.

7. The method of claim 6, wherein the hypertext transfer protocol redirect forces a stack of the user endpoint device to switch from internet protocol version 4 to internet protocol version 6.

8. The method of claim 6, wherein the stack redirect function is integrated with a network exposure function of the communications network.

9. The method of claim 1, wherein the querying the binding support function comprises providing the binding support function with the internet protocol version 6 address of the user endpoint device and receiving, from the binding support function, the subscription permanent identifier that is indexed to the internet protocol version 6 address of the user endpoint device.

10. The method of claim 1, wherein the querying the unified data management function comprises providing the unified data management function with the subscription permanent identifier and the identifier of the application function and receiving, from the unified data management function, the application function-specific user endpoint identifier.

11. The method of claim 10, wherein the application function-specific user endpoint identifier is indexed to the subscription permanent identifier and the identifier of the application function in a unified data repository, and the unified data management function retrieves the application function-specific user endpoint identifier from the unified data repository.

12. The method of claim 10, wherein the unified data management function dynamically generates the application function-specific user endpoint identifier prior to providing the application function-specific user endpoint identifier to the processing system.

13. The method of claim 1, wherein the application function-specific user endpoint identifier comprises an external identifier for the user endpoint device.

14. The method of claim 1, wherein the forwarding comprises sending a hypertext transfer protocol redirect to the user endpoint device, wherein a query parameter of the hypertext transfer protocol redirect contains the application function-specific user endpoint identifier.

15. The method of claim 1, wherein the application function forwards the application function-specific user endpoint identifier to the user endpoint device.

16. The method of claim 1, further comprising:
   forwarding, by the processing system, the application function-specific user endpoint identifier associated with the subscription permanent identifier and the identifier of the application function to the user endpoint device.

17. The method of claim 1, wherein the communications network is a fifth generation cellular network.

18. The method of claim 1, wherein the application function-specific management function also stores a different application function-specific user endpoint identifier that is unique to a combination of the user endpoint device and a different application function.

19. A non-transitory computer-readable medium storing instructions which, when executed by a processing system including at least one processor, cause the processing system to perform operations, the operations comprising:
   receiving, from an application function of a communications network, a redirected request for an application function-specific user endpoint identifier that is unique to a combination of a user endpoint device and the application function, where a version of the redirected request that was sent from the user endpoint device to the application function included an internet protocol version 4 address associated with the user endpoint device that the application function could not map to the application function-specific user endpoint identifier and the redirected request includes an identifier of the application function and an internet protocol version 6 address associated with the user endpoint device;

querying a binding support function of the communications network for a subscription permanent identifier associated with the internet protocol version 6 address associated with the user endpoint device;

querying an application function-specific management function for an application function-specific user endpoint identifier associated with the subscription permanent identifier and the identifier of the application function; and forwarding the application function-specific user endpoint identifier associated with the subscription permanent identifier and the identifier of the application function to the application function.

20. A system comprising:

a processing system including at least one processor; and a non-transitory computer-readable medium storing instructions which, when executed by the processing system, cause the processing system to perform operations, the operations comprising:

receiving, from an application function of a communications network, a redirected request for an application function-specific user endpoint identifier that is unique to a combination of a user endpoint device and the application function, where a version of the redirected request that was sent from the user endpoint device to the application function included an internet protocol version 4 address associated with the user endpoint device that the application function could not map to the application function-specific user endpoint identifier and the redirected request includes an identifier of the application function and an internet protocol version 6 address associated with the user endpoint device;

querying a binding support function of the communications network for a subscription permanent identifier associated with the internet protocol version 6 address associated with the user endpoint device;

querying an application function-specific management function for an application function-specific user endpoint identifier associated with the subscription permanent identifier and the identifier of the application function; and forwarding the application function-specific user endpoint identifier associated with the subscription permanent identifier and the identifier of the application function to the application function.

\* \* \* \* \*